United States Patent Office 3,654,336
Patented Apr. 4, 1972

3,654,336
PREPARATION OF ISOPROPENYL-
PHENYLISOCYANATES
Heinrich Krimm, Krefeld-Bochum, Hans Josef Buysch, Krefeld, and Hermann Schnell, Krefeld-Uerdingen, Germany, assignors to Farbenfabriken Bayer Aktiengesellschaft, Leverkusen, Germany
No Drawing. Filed Aug. 8, 1968, Ser. No. 751,041
Claims priority, application Germany, Aug. 17, 1967,
F 53,257
Int. Cl. C07c 119/04
U.S. Cl. 260—453 PH                          4 Claims

ABSTRACT OF THE DISCLOSURE

Isopropenyl-phenylisocyanates useful in preparing synthetic resins by the polyaddition reaction are prepared by reacting aminophenyl dimethyl carbinols with phosgene at an elevated temperature.

---

This invention relates generally to organic isocyanates and to a method of producing said isocyanates. More particularly, this invention relates to isopropenyl-phenylisocyanates and to a method of preparing isopropenyl-phenylisocyanates.

The compound 4-isopropenyl-phenylisocyanate has heretofore been known but has only been obtainable by the process disclosed in U.S. Pat. No. 2,640,068. In the process according to said U.S. patent, p-isopropenyl aniline is reacted with phosgene in the presence of an amine at room temperature or below to form p-isopropenyl-phenyl carbamic acid chloride which is then converted in a second state, after removal of unreacted amine hydrochloride into the isocyanate at elevated temperature with removal of hydrogen chloride. The yield is as a rule generally not more than about 60% to about 63% of the theoretical. Since this method of preparation is very complicated and only provides moderate yields, it has not been exploited heretofore on an industrial scale. The reason given for carrying out phosgenation in two steps in the heretofore known process is that side products such as uretidine diones and, in particular, polymers of the isopropenyl moiety are formed after phosgenation is carried out in the usual manner in one stage with heating, thereby severely reducing the yield of monomeric isocyanate.

It is therefore an object of this invention to provide isopropenyl-phenylisocyanates and a method for producing same devoid of the disadvantages and problems set forth hereinabove. It is also an object of this invention to provide a process for the production of isopropenyl-phenylisocyanates in a single stage reaction. A further object of this invention is to provide a process for the production of isopropenyl-phenylisocyanates which does not require the use of an auxiliary base such as an additional amine. A still further object of this invention is to provide a process for the production of isopropenyl-phenylisocyanates without the necessity for removing excess amine hydrochloride. A further additional object of this invention is to provide a process for the production of isopropenyl-phenylisocyanates in a much shorter reaction time which results in a process providing substantially higher yields of pure isopropenyl-phenylisocyanates. A still further additional object of this invention is to provide a process for the production of isopropenyl-phenylisocyanates without the necessity for preparing isopropenyl aniline as a reactant.

The foregoing objects and others which will become apparent from the following description are accomplished in accordance with this invention, generally speaking, by a process for the production of isopropenyl-phenylisocyanates which comprises reacting in a single stage process aminophenyl dimethyl carbinols with phosgene at an elevated temperature. More particularly, the objects of this invention are accomplished by a process for the production of isopropenyl-phenylisocyanates in which aminophenyl dimethyl carbinols are reacted with phosgene at an elevated temperature of from about 75° C. to about 200° C. in such a way that during the whole of the reaction time the quantity of phosgene available is at least equivalent to the aminocarbinol present in the reaction mixture.

The process of this invention can be applied to the production of any suitable isopropenyl-phenylisocyanates, alkyl substituted isopropenyl-phenylisocyanates or mixtures thereof. According to the process of this invention, any suitable isopropenyl-phenylisocyanate or mixtures thereof may be prepared by reacting a suitable aminophenyl dimethyl carbinol or mixtures thereof such as those of the formula

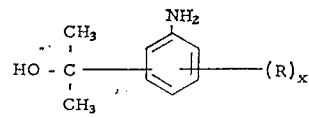

wherein $x$ is 4 and each R may be either a hydrogen atom or an alkyl radical, preferably containing from 1 to 6 carbon atoms, with phosgene. As examples of suitable aminophenyl dimethyl carbinols, there may be mentioned 4-aminophenyl dimethyl carbinol, 3-aminophenyl dimethyl carbinol, 2-isopropyl-4-aminophenyl dimethyl carbinol, 3-isopropyl-4 - aminophenyl dimethyl carbinol, 2,6 - diisopropyl-5-aminophenyl dimethylc arbinol, 3,5-diisopropyl-4-aminophenyl dimethyl carbinol, isomeric aminophenyl dimethyl carbinols and any other suitable alkyl substituted aminophenyl dimethyl carbinols within the scope of the above formula. Suitable alkyl substituents include lower alkyl radicals such as methyl, ethyl, propyl, butyl, amyl and hexyl radicals. Also mixtures of the hereinabove mentioned compounds may be used to prepare mixtures of isopropenyl-phenylisocyanates. Examples of suitable mixtures include 4-aminophenyl dimethyl carbinol with 3-aminophenyl dimethyl carbinol and the like. The aminophenyl dimethyl carbinol reactants may be prepared according to French patent specification 1,532,819.

Isopropenyl-phenylisocyanates may be prepared from any of the suitable aminophenyl dimethyl carbinols set forth hereinbefore. In addition to the preparation of the compound 4-isopropenyl-phenylisocyanate, the process of this invention may also be used to prepare isopropenyl-phenylisocyanates which have not been heretofore known such as, for example, those having the formulae

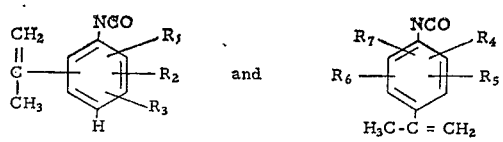

as well as mixtures of isopropenyl-phenylisocyanates having the formulae

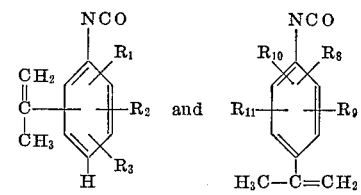

wherein $R_1$, $R_2$, $R_3$, $R_4$, $R_5$, $R_6$, $R_7$, $R_8$, $R_9$, $R_{10}$ and $R_{11}$ may each be either a hydrogen atom or an alkyl radical, preferably containing from 1 to 6 carbon atoms, with the proviso that at least one of $R_4$, $R_5$, $R_6$ and $R_7$ is an alikyl radical. These isocyanates include, for example, 3-isopropenyl-phenylisocyanate, 4 - isopropenyl - 2-isopropyl-phenylisocyanate, 4 - isopropenyl-2,6-diisopropyl-phenylisocyanate mixtures thereof and mixtures with 4-isopropenyl phenylisocyanate.

The isopropenyl-phenylisocyanates of this invention are prepared by reacting aminophenyl dimethyl carbinols or mixtures of aminophenyl dimethyl carbinols with phosgene preferably, in an inert organic diluent at a temperature of between about 75° C. and about 200° C., preferably between about 100° C. and about 150° C. The quantity of phosgene present during the whole of the reaction time is always at least equivalent to the aminocarbinol present in the reaction mixture. In determining the quantity of phosgene to be used, one should remember that theoretically two mols of phosgene are required per mol of aminocarbinol since phosgene can also react with the hydroxyl group and with the water that has been split off.

Any suitable inert organic diluent such as those conventionally used for carrying out phosgenation at elevated temperatures may be used provided they do not react with the isopropenyl group and include, for example, the aromatic hydrocarbons such as toluene, xylene, naphthalene, tetrahydronaphthalene, benzene, diphenyl, cymene, amylbenzene and the like; cycloaliphatic hydrocarbons such as cyclohexane and the like; the halogenated aromatic hydrocarbons such as chlorbenzene, bromobenzene, ortho-dichlorobenzene, 1,2,4-trichlorobenzene, chlorotoluene and the like; the chlorinated aliphatic hydrocarbons such as carbon tetrachloride, tetrachloroethylene, trichloroethylene and the like.

A particular preferred embodiment of this invention comprises carrying out the production of isopropenyl-phenylisocyanates by saturating a suitable inert organic solvent with phosgene at an elevated temperature and then adding a solution of an aminocarbinol to a suitable solvent while phosgene is continuously introduced with stirring at such a rate that phosgene is present in the reaction solution in a quantity at least equivalent to the amount of carbinol present. The water liberated from the aminocarbinol reacts relatively slowly with phosgene. It may be quickly removed from the reaction mixture, for example, by azeotropic distillation in order to reduce the quantity of phosgene used and also to prevent side reactions from occurring. The products of the process of this invention are then isolated in the usual manner in accordance with procedures known to those skilled in the art, such as, for example, by distillation or the like. The isopropenyl-phenylisocyanates produced according to the process of this invention are produced in yields usually of from about 85% to about 92% of the theoretical.

The isopropenyl-phenylisocyanates produced according to the process of this invention are valuable intermediates for use in the production of synthetic resins by the polyaddition reaction mechanism according to methods known to those skilled in the art.

It has surprisingly been found that when isopropenyl-phenylisocyanates are prepared according to the process of this invention by a process utilizing as the starting material an aminophenyl dimethyl carbinol instead of isopropenyl aniline, that the starting material can be converted in a single reaction step to the desired unsaturated isocyanate so that it is no longer necessary to use an auxiliary base and an additional working up step, namely, the removal of excess amine hydrochloride. Furthermore, the reaction time is much shorter than in the process according to the previously mentioned U.S. patent or a conventional phosgenation reaction carried out without heating. Two reactions occur simultaneously during the process of this invention, namely, dehydration into an olefin and formation of the isocyanate. It is, therefore, unnecessary to initially carry out a separate preparation of isopropenyl aniline by removal of water from the corresponding aminocarbinol. Also, it has surprisingly been found that substantially higher yields of the pure isopropenyl-phenylisocyanates are obtained in the single stage process of this invention.

The invention is further illustrated but is not intended to be limited by the following examples in which all parts and percentages are by weight unless otherwise specified.

EXAMPLE 1

About 200 ml. of chlorobenzene are saturated with phosgene at about 120° C. to about 120° C. to about 130° C. in a two-litre three-necked flask equipped with stirrer, thermometer, gas inlet tube and water sepaartor. A solution of about 75.5 parts (about 0.5 ml.) of 4-aminophenyl dimethyl carbinol in about 700 ml. of chlorobenzene is then added dropwise with stirring and boiling under reflux while phosgene is constantly maintained in the solution. Water soon settles in the water separator and is removed from time to time. A total of about 4 to 5 parts of water are separated. If the reactants are added rapidly in suitable proportions, the reaction is completed after about 1 to about 1½ hour. Excess phosgene (a total of about 1.2 to about 1.5 mol., which is about 120 parts to about 150 parts was introduced) is driven off by passing in nitrogen, and the chlorobenzene is distilled off. By careful distillation under a water jet vacuum, 70 parts of an almost colorless liquid consisting of 4-isopropenyl-phenylisocyanate are obtained at about 11 mm. Hg and at 101° C. to 102° C. Yield: About 87% of the theoretical. The isocyanate content of the product of this reaction is 27.0%–27.2% (calculated 27.6%). Iodine number according to Woburn 157–164 (calculated 159.5).

EXAMPLE 2

About 75.5 parts (about 0.5 mol) of a mixture of about 89% of 4-aminophenyl dimethyl carbinol and about 11% of 3-aminophenyl dimethyl carbinol are phosgenated as in Example 1. The contents were determined by gas chromatography. About 60 parts of a colorless liquid which was shown by gas chromatography to consist of about 90% 4- and about 10% 3-isopropenyl-phenylisocyanate are obtained by distillation at about 10 mm. Hg and 98° C. to 102° C. The yield is about 86% of the theoretical. The isocyanate content of the product of this reaction is 26.9 to 27.3% (calculated 27.6%). Iodine number according to Woburn 155–165. (calculated 159.5).

EXAMPLE 3

About 96.5 parts (about 0.5 mol) of 3-isopropyl-4-aminophenyl dimethyl carbinol are reacted with phosgene as in Example 1.

The distillation which follows yields 91 parts of a colorless liquid of boiling point of 73° C. to 75° C. at 0.4 mm. Hg, and consisting of 4-isopropenyl-2-isopropyl phenylisocyanate. The yield is about 90% of the theoretical.

| Analysis | Found | Calculated |
| --- | --- | --- |
| $C_{13}H_{15}NO$ (201.26): | | |
| Percent NCO | 21.1 | 20.9 |
| Iodine number according to Woburn | 125–126 | 126 |
| C | 77.80 | 77.58 |
| H | 7.54 | 7.51 |
| N | 6.94 | 6.96 |
| O | 7.90 | 7.95 |

EXAMPLE 4

About 47.0 parts (about 0.2 mol) of 3,5-diisopropyl-4-aminophenyl dimethyl carbinol are dissolved in about 500 ml. of chlorobenzene and added dropwise to about 200 ml. of chlorobenzene which has been saturated with phosgene and heated to about 128° C. to about 130° C., and at the same time phosgene is introduced and the reaction mixture is stirred. A total of about 58 parts of phosgene (0.58 mol) is introduced and about 2 parts of water are separated off. The aminocarbinol has completely undergone reaction after about 40 minutes. The reaction conditions are maintained for about a further 10 minutes and the product is isolated as described in Example 1. 4-isopropenyl-2,6-diisopropyl phenylisocyanate of boiling point 80° C. to 82° C. at about 0.2 mm. is obtained in a yield of 45 parts corresponding to about 92% of the theoretical.

| Analysis | Found | Calculated |
|---|---|---|
| $C_{16}H_{21}NO$ (243.34): | | |
| Percent NCO | 18.1 | 18.2 |
| Iodine number according to Woburn | 103–108 | 104.5 |
| C | 78.63 | 78.97 |
| H | 8.65 | 8.70 |
| N | 5.70 | 5.76 |
| O | 6.79 | 6.58 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of an isopropenyl-phenylisocyanate comprising reacting an aminophenyl dimethyl carbinol, having the formula

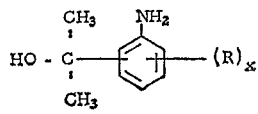

wherein $x$ is 4 and each R is selected from the group consisting of a hydrogen atom or an alkyl radical containing from 1 to 6 carbon atoms, with phosgene at an elevated temperature and removing the liberated water from the reaction mixture, the quantity of phosgene present during the reaction being at least equivalent to the amino carbinol in the reaction mixture.

2. The process of claim 1 wherein the reaction is conducted in an inert organic diluent at a temperature of from 75° C. to 200° C.

3. The process of claim 1 wherein the reaction is conducted in an inert organic diluent at a temperature of from 100° C. to 150° C.

4. The process of claim 2 wherein the aminophenyl dimethyl carbinol reactant is selected from the group consisting of 4-aminophenyl dimethyl carbinol, 3-isopropyl-4-aminophenyl dimethyl carbinol, 3,5-diisopropyl-4-aminophenyl dimethyl carbinol and a mixture of 4-aminophenyl dimethyl carbinol and 3-aminophenyl dimethyl carbinol.

References Cited
UNITED STATES PATENTS

| 2,468,713 | 4/1949 | Kropa et al. | 260—453 R |
| 2,640,068 | 5/1953 | Schaefer et al. | 260—453 |

JOSEPH REBOLD, Primary Examiner

D. H. TORRENCE, Assistant Examiner

U.S. Cl. X.R.

260—77.5 R, 453 AR, 575